(12) United States Patent
Meixner

(10) Patent No.: US 10,853,908 B2
(45) Date of Patent: *Dec. 1, 2020

(54) IMAGE PROCESSOR COMPLEX TRANSFER FUNCTIONS

(71) Applicant: Google LLC, Mountain View, CA (US)

(72) Inventor: Albert Meixner, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/779,257

(22) Filed: Jan. 31, 2020

(65) Prior Publication Data

US 2020/0258190 A1   Aug. 13, 2020

Related U.S. Application Data

(63) Continuation of application No. 16/273,663, filed on Feb. 12, 2019, now Pat. No. 10,552,939.

(51) Int. Cl.
*G06T 1/60* (2006.01)
*G06T 1/20* (2006.01)

(52) U.S. Cl.
CPC ............... *G06T 1/60* (2013.01); *G06T 1/20* (2013.01); *G06T 2200/28* (2013.01); *G06T 2210/12* (2013.01); *G06T 2210/52* (2013.01)

(58) Field of Classification Search
None
See application file for complete search history.

(56) References Cited

U.S. PATENT DOCUMENTS

| | | | |
|---|---|---|---|
| 6,016,152 | A | 1/2000 | Dickie |
| 7,782,334 | B1 | 8/2010 | Kilgard et al. |
| 9,241,090 | B2 | 1/2016 | Mita |
| 9,769,356 | B2 | 9/2017 | Shacham et al. |
| 9,772,852 | B2 | 9/2017 | Meixner et al. |
| 9,830,150 | B2 | 11/2017 | Vasilyev et al. |

(Continued)

FOREIGN PATENT DOCUMENTS

| | | |
|---|---|---|
| TW | 201802727 | 1/2018 |
| TW | 201830329 | 8/2018 |
| TW | 201902215 | 1/2019 |

OTHER PUBLICATIONS

Hsu et al., "Efficient Edge-Oriented Based Image Interpolation Algorithm for Non-Integer Scaling Factor," 2017 Asia-Pacific Signal and Information Processing Association Annual Summit and Conference (APSIPA ASC), Dec. 2017, 1156-1159.

(Continued)

*Primary Examiner* — Nicholas R Wilson
(74) *Attorney, Agent, or Firm* — Fish & Richardson P.C.

(57) ABSTRACT

Methods, systems, and apparatus, including computer programs encoded on computer storage media, for supporting complex transfer functions on an image processor. One of the methods includes traversing, by each execution lane of an image processor using a shift-register array, a respective local support region and storing input pixels encountered during the traversal into local memory of the image processor. Each execution lane obtains from the local memory of the image processor one or more input pixels according to a complex transfer function. Each execution lane computes a respective output pixel for the kernel program using one or more input pixels obtained from the local memory according to the complex transfer function.

20 Claims, 7 Drawing Sheets

(56) References Cited

U.S. PATENT DOCUMENTS

| | | |
|---|---|---|
| 9,965,824 B2 | 5/2018 | Zhu et al. |
| 2016/0316094 A1 | 10/2016 | Meixner et al. |
| 2017/0163931 A1 | 6/2017 | Redgrave |
| 2017/0310855 A1 | 10/2017 | Schacham |
| 2018/0005346 A1 | 1/2018 | Meixner et al. |

OTHER PUBLICATIONS

PCT International Search Report and Written Opinion in International Appln. No. PCT/US2019/063421, dated Mar. 12, 2020, 15 pages.
Ragan-Kelley et al., "Halide: A Language and Compiler for Optimizing Parallelism, Locality, and Recomputation in Image Processing Pipelines," ACM SIGPLAN Notices, Jun. 2013, 519-230.
TW Office Action in Taiwanese Application No. 108143270, dated May 25, 2020, 7 pages (with English translation).

```
                    300

┌─────────────────────────────────┐
        │ Determine distance between base │
        │ position and input pixel        │
        │ position in each dimension      │
        │              310                │
        └─────────────────────────────────┘
                        │
                        ▼
        ┌─────────────────────────────────┐
        │ Subtract execution lane         │
        │ position in each dimension      │
        │              320                │
        └─────────────────────────────────┘
                        │
                        ▼
        ┌─────────────────────────────────┐
        │ Multiply by width of local      │
        │ bounding box in each dimension  │
        │ and add products together       │
        │              330                │
        └─────────────────────────────────┘
```

FIG. 3

IMAGE PROCESSOR COMPLEX TRANSFER FUNCTIONS

CROSS-REFERENCE TO RELATED APPLICATION

This application is a continuation application of, and claims priority to pending U.S. application Ser. No. 16/273,663, filed on Feb. 12, 2019. The entirety of the disclosure of the prior application is herein incorporated by reference.

BACKGROUND

This specification relates to image processors.

Image processors are programmable, domain-specific parallel processing devices that are designed to take advantage of two-dimensional spatial locality in image data. Image processors are designed to efficiently process existing image data, which distinguishes them from graphics processing units (GPU), which are designed to generate images in the first instance from an internal representation.

Image processors are designed for high-efficiency, low-power, parallel execution of workloads with two-dimensional spatial locality. A computing task has two-dimensional spatial locality when output data for a location in the input data is dependent on data that neighbors or is nearby the location in the input data. For example, a 3×3 blur filter can use data in a 9-pixel square region of input image data in order to compute an output value for a pixel at the center of the square region. In this specification, the input region needed to generate an output pixel is referred to as an input support region. This example blur filter has spatial locality because the output value uses data from neighboring pixels. Image processors can also be used for high performance parallel execution of workloads in other domains, including computer vision, object recognition, neural networks, and other machine learning tasks.

Programming an image processor typically requires writing and compiling a kernel program, which is then executed concurrently by each of a plurality of execution lanes of the image processor. Each execution lane is itself a component that can execute instructions and store data in one or more registers.

Some image processors take advantage of spatial locality by coupling an array of execution lanes to an array of shift registers. Each execution lane can access data required for its kernel program by shifting the input data within the array of shift registers rather than performing memory accesses. Conceptually, this can be thought of shifting an array of image data beneath an array of execution lanes. For example, an execution lane can access data required to compute a blur filter by repeatedly reading data shifted in snake-scan order: two pixels to the left, one pixel down, two pixels to the right, one pixel down, and two pixels to the left.

Many kernel programs that implement image processing algorithms are executed by systematically stepping through an input image in a fixed traversal pattern to read an input support region needed to generate each output pixel. In this specification, a transfer function is a function that defines a relationship between a location of an output pixel and a location of an input support region needed to generate a value for the output pixel according to a particular kernel program. In other words, a transfer function defines the inputs for a particular output pixel.

Many image processing algorithms use simple transfer functions that rely on global integer offsets, which means that the same integer offsets are applied for all output pixels regardless of the location of the output pixel. For such simple transfer functions, the position of an input pixel in the input support region can be expressed using simple integer offsets from the position of the output pixel (x, y), e.g., using transfer functions of the following form: f(x, y)=(x+x_offset, y+y_offset). For these simple transfer functions, the value of x_offset and the value of y_offset are the same for all output pixels.

However, some image processing algorithms have a complex transfer function, which is a transfer function that cannot be expressed in terms of global integer offsets. Non-integer rescaling is one example of a complex transfer function. For example, if an image is to be rescaled by a factor of 1.3, the transfer function cannot be expressed in terms of global integer offsets.

Some complex transfer functions can also vary the size and location of the input support region depending on the location of the output pixel in the image. For example, for an image processing algorithm designed to correct camera lens distortion, the output pixels on the edges of the image, e.g., where the distortion is most severe, will rely on input support regions that are both larger in size and have larger offsets than input support regions used to compute output pixels near the center of the image, where the distortion is least severe. Therefore, these kinds of image processing algorithms typically must be executed by a CPU, which is less energy efficient and slower than executing them directly on an image processor, or must be executed by a specially designed separate hardware device, which makes the chip design more complicated, larger, and more expensive.

SUMMARY

Generating from a kernel program defining a complex transfer function output code that when executed in an image processor causes the image processor to perform operations according to the complex transfer function. This permits kernel programs to be executed directly by an image processor itself, without relying on execution of the transfer function by a CPU or a GPU.

In this specification, a complex transfer function is a transfer function that does not use global integer offsets. In other words, a complex transfer function is a transfer function that uses one or more of non-integer offsets, offsets that depend on the output pixel location, or input support regions whose size depends on the output pixel location.

Complex transfer functions can be used to compute a variety of image distortion algorithms. Examples of distortion functions that use complex transfer functions include rescale operations, rotation operations, lens distortion correction processes, and image alignment processes, to name just a few examples.

Thus, in the examples below, a kernel program that defines a transformation of image data using a complex transfer function will be referred to as a distortion function. However, the same techniques can also be used for other applications that do not relate to generating or distorting image data.

In this specification, a shift-register array is a hardware device that logically arranges shift registers in a two-dimensional layout such that shift registers can shift data to one another, possibly taking only a single clock cycle. Shift-register arrays are typically implemented as a ring or a torus so that data from one edge of the shift-register array can be shifted directly to the other edge of the shift-register array in one or more dimensions.

Particular embodiments of the subject matter described in this specification can be implemented so as to realize one or more of the following advantages. Because distortion functions can be executed in software on the image processor itself, the image processor need not have a separate hardware component dedicated to executing distortion functions. This reduces both the size of the image processor and the cost to manufacture the image processor. Additionally, using the methods described in this specification, the image processor can execute complex transfer functions more efficiently than a CPU by using the shift-register array and the execution lane array to perform the computations. The use of local memory to temporarily store input support regions also reduces off-chip memory accesses that would generally have to be performed in a CPU. This further improves the speed and energy efficiency of executing complex transfer functions in the image processor relative to a CPU. In addition, using an image processor instead of a CPU to compute complex transfer functions makes the performance much more predictable. This is because using the CPU uses caches that provide varied performance depending on the workload, which makes the performance harder to predict in advance.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 3 is a flow chart of an example process for computing a linear memory address.

Like reference numbers and designations in the various drawings indicate like elements.

DETAILED DESCRIPTION

Figure 1A:
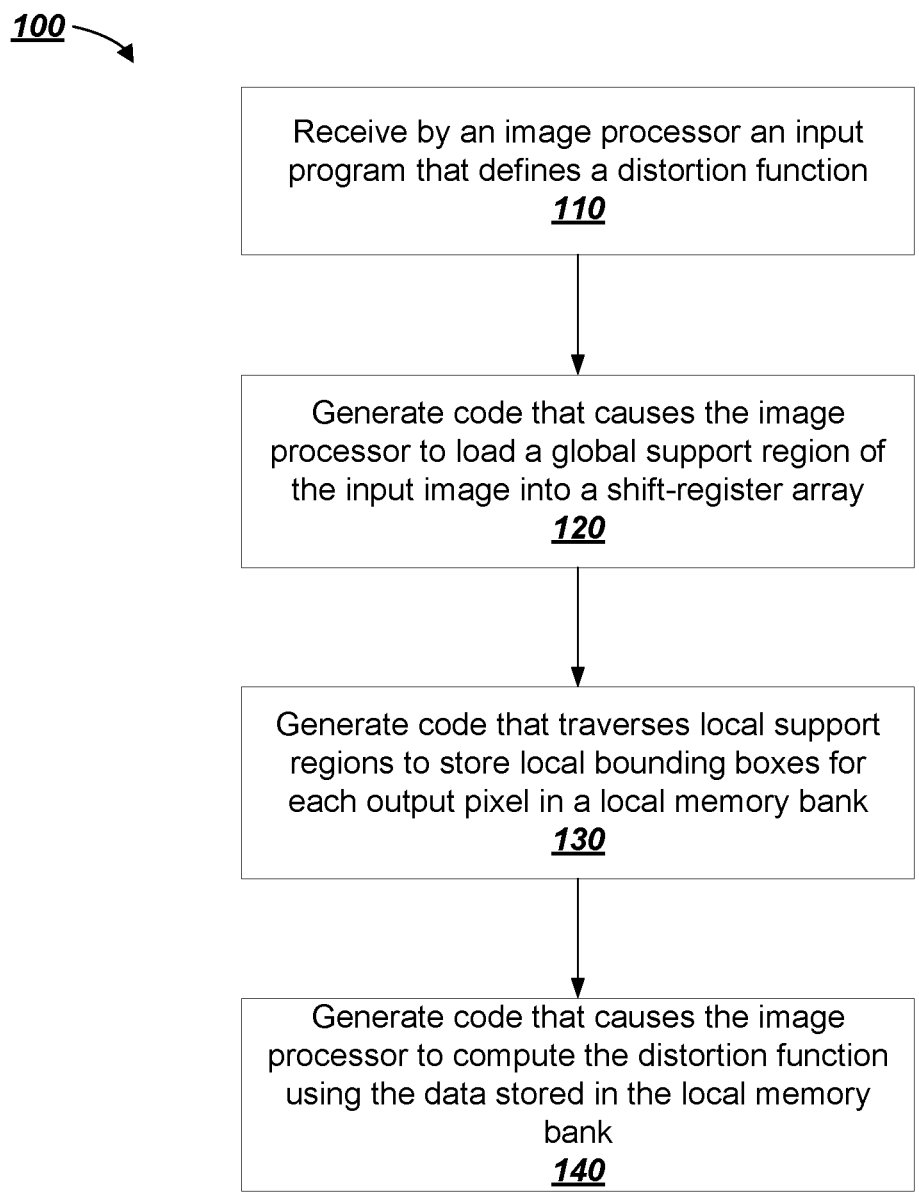
FIG. 1A is a flow chart of an example process for executing a distortion function.

FIG. 1A is a flow chart of an example process 100 for generating an output program that allows an image processor to execute a distortion function having a complex transfer function. The example process 100 can be performed by any appropriately programmed computer system, e.g., by a compiler, an assembler, or a program optimizer for an image processor, to name just a few examples. For convenience, the example process 100 will be described as being performed by an appropriately programmed system of one or more computers.

The system receives an input program that defines a distortion function (110). The program code of the input program can be written in any appropriate programming language that can define a distortion function. For example, the program code can be in a high-level programming language, e.g., C or Halide; an intermediate language representation; or a lower-level programming language, e.g., assembly. In general, the distortion function is a function that generates output values that each rely on an input support region, e.g., output pixels that depend on an input support region of input pixels. The distortion function can have a complex transfer function that defines the relationship between the location of an output value and each input value of the input support region.

Consider the following example input kernel program in TABLE 1. The input kernel program is written in a high-level, C-like pseudocode.

TABLE 1

| 1  | int f(x) { |
| 2  |   return ( x * 3840 ) / 4096 |
| 3  | } |
| 4  | |
| 5  | int g(y) { |
| 6  |   return ( y * 2896 ) / 4096 |
| 7  | } |
| 8  | |
| 9  | scale_img( x, y ) { |
| 10 | |
| 11 |   // each output pixel uses two horizontally |
| 12 |   // adjacent samples from the input support region |
| 13 |   sample1 = input[ f(x) ][ g(y) ]; |
| 14 |   sample2 = input[ f(x) + 1 ][ g(y) ] |
| 15 | |
| 16 |   // the samples are averaged to generate the output |
| 17 |   // pixel for coordinate x,y |
| 18 |   output[ x ][ y ] = average( sample1, sample2 ) |

The kernel program in TABLE 1 has a distortion function named "scale_img" on line 9 that upscales an image region defined by the two-dimensional "input" buffer by writing an output to an output image region defined by the two-dimensional "output" buffer. The scale_img distortion function operates by averaging two samples from the input region and writing the average to the output region.

The kernel program also defines two transfer functions: f(x) on line 1, and g(y) on line 5. The effect of these transfer functions is to upscale the image by 1.06 in x and 1.4 in y. These are both complex transfer functions because they depend on the input coordinates and they rely on non-integer offsets. Thus, scale_img cannot be computed using global integer offsets.

Figure 1B:
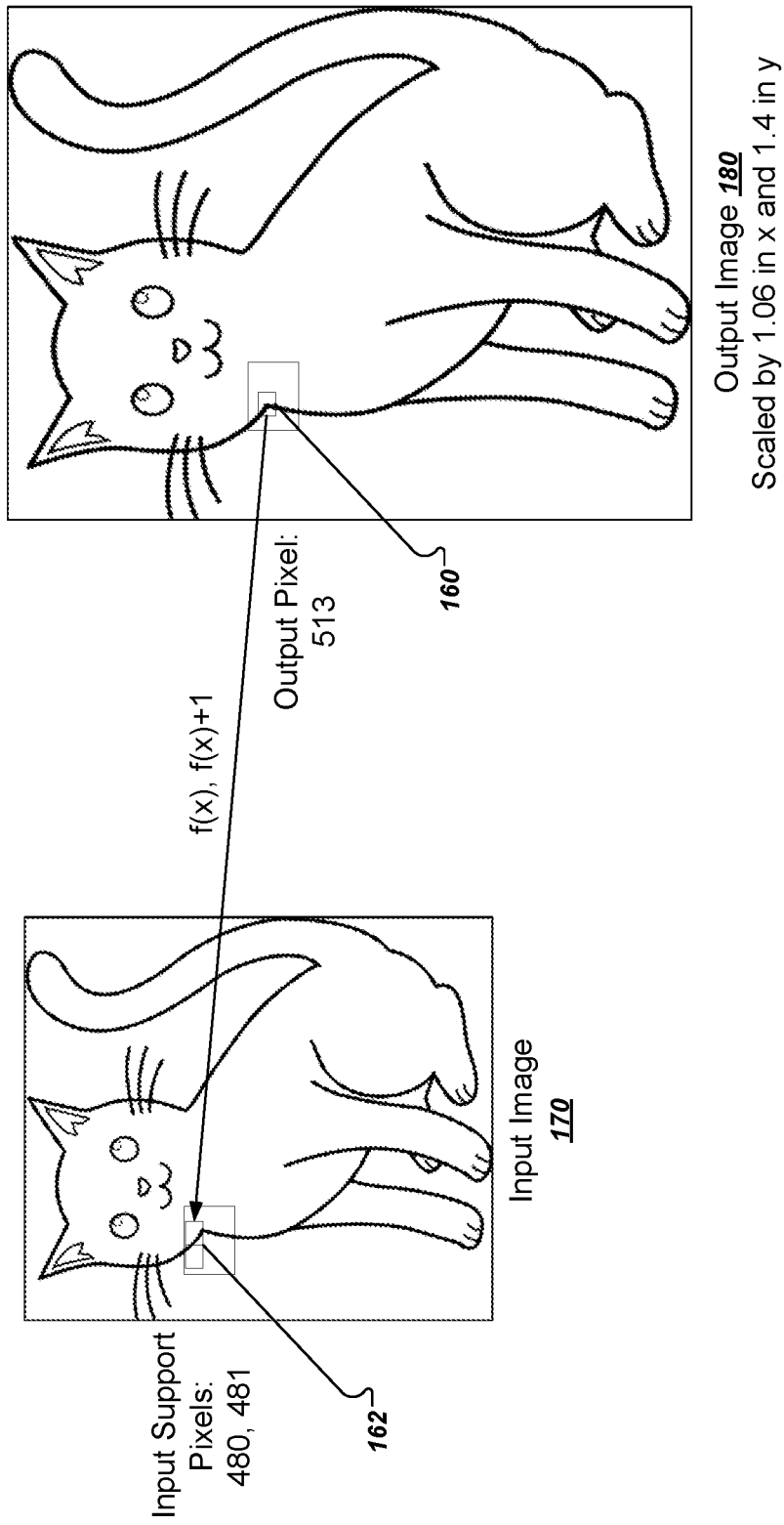
FIG. 1B illustrates general operation of a kernel program.

FIG. 1B illustrates the general operation of the kernel program. Every output pixel value in the output image relies on two input pixels from the input image. For example, the output pixel 160 in the output image 180 relies on two input support pixels 162 in the input image 170. And the relationship between the location of the output pixel and the locations of the input pixels is defined by the transfer functions f(x) and g(y).

In some implementations, a compiler for the program considers any function that appears in an expression for a buffer index to be a complex transfer function. For example, on line 13, the index expressions for the "input" buffer both include function calls. Therefore, this can trigger the compiler to generate code to handle the complex transfer functions without making any kind of determination of whether the transfer functions could be implemented using global integer offsets.

In fact, the techniques described in this specification allow an input program to use arbitrarily complex transfer functions that appear in expressions of buffer indexes. This enables a vast array of complex image processing and other applications to be executed directly on the image processor without requiring support from a CPU or a GPU.

To see how a complex transfer function makes a difference in processing, consider the result of the transfer function f(x) for pixel locations in the x-dimension starting at 510. This is illustrated in TABLE 2:

TABLE 2

| x (output pixel) | f(x) (input pixel 1) | f(x) + 1 (input pixel 2) |
|---|---|---|
| 510 | 478 | 479 |
| 511 | 479 | 480 |
| 512 | 480 | 481 |
| 513 | 480 | 481 |
| 514 | 481 | 482 |

Because of integer division defined in f(x), pixels 512 and 513 result in the same value for f(x) (and f(x)+1). Therefore, it would be impossible to use global integer offsets to obtain the correct data needed to compute the kernel program on an image processor having an execution lane executing in lockstep. In other words, an execution lane array that has no mechanism for loading from an arbitrary memory offset would not obtain the correct values for the kernel program.

Therefore, the system can generate additional code that allows the image processor to handle such kernel programs that include such complex transfer functions.

As shown in FIG. 1A, the system generates code that causes the image processor to load a global input support region of the input image into the shift-register array (120). The global input support region is a region of the input image needed to compute output pixel values of a particular output block. Usually the output block is the size of the execution lane array of the image processor. In other words, each execution lane can compute an output pixel value in the output block, although when computing values for edges and corners, fewer than all execution lanes may generate an actual output value.

In determining the data to be loaded, the transfer function can be used to compute a global bounding box of the global input support region. This process involves computing the position of the first corner of the bounding box and also the size of the bounding box.

To compute the position, the generated code can use coordinates of a corner of the output block as input to the transfer function. In some implementations, for each output block that is processed, the image processor maintains the coordinates of one corner, e.g., the top-left corner, of the output block in reserved registers. The following example snippet of code causes an image processor to use the reserved registers sx and sy as input to the transfer function to compute a corner of the global bounding box:

//Use transfer function to compute corner of global bounding box
//(sx, sy)=position of the top-left corner of the output block
3: mul.b16 st0←sx, 3840;
4: shr.b16 st1←st0, 12;
5: mul.b16 st2←sy, 2896;
6: shr.b16 st3←st2, 12;

Lines 3 and 5 respectively multiply sx and sy by the rescaling factors specified in the example transfer function. The shift-right instructions on lines 4 and 6 effectively divide by 4096, as specified in the example transfer function.

The size of the global bounding box can be computed either by the image processor at runtime or by the compiler at compile time. The compiler can compute the size of the global bounding box for transfer functions whose global bounding boxes do not vary in size. For example, for the example rescale operation, the compiler can use the transfer function to compute the correct size of the global support region at compile time because the size of the bounding box is the same for all output blocks. To cause the image processor to compute the size of the bounding box, the compiler can generate code that causes the image processor to compute a second corner of the global bounding box using the transfer function and to compute the size using the first and second computed corners of the bounding box. After determining the position and size of the global bounding box, the code causes the image processor to load the global support region into the shift-register array.

The system generates program code that traverses local support regions to store local bounding boxes for each output pixel in a local memory bank (130). Each local bounding box includes the input support region needed to compute a particular output pixel, as well as possibly other pixels. In other words, the local bounding box may be larger than the input support region, but it always includes all required pixels for the input support region. Each local bounding box is also a sub-region of the global support region. A local bounding box can be a single pixel or a group of pixels, depending on the particular distortion function.

The compiler can compute the size of the local bounding box for some transfer functions, e.g., transfer functions whose input support region is always the same size. However, if the size of the local bounding box depends on the position of the output pixel, the compiler can generate code that causes each execution lane to compute a size of its own local bounding box according to the transfer function. This process will be described in more detail in reference to FIG. 2.

The generated program code causes each execution lane to traverse the input support region defined by the local bounding box. At each location, each execution lane can store the input pixel value in a local memory bank coupled to the execution lane.

TABLE 3 illustrates an example of the contents of memory for the example in FIG. 1B after performing this process. For illustrative purposes, TABLE 3 contains the input pixel locations in x, although in practice, the actual pixel values would be stored.

As shown, each value of x stored three values corresponding to the size of the local bounding box. In this case, the size of the local bounding box was 3, which is one more than the size of the two-pixel input support region. In other words, the system can round up from the size of the input support region in both x and y so that the process can to capture in local memory all the input pixels needed to compute the output pixels. Therefore, both pixel 512 and 513 store the data for input pixels 480 and 481, although at different respective offsets.

TABLE 3

| x = 510 | 477 | 478 | 479 |
|---|---|---|---|
| x = 511 | 478 | 479 | 480 |
| x = 512 | 479 | 480 | 481 |
| x = 513 | 480 | 481 | 482 |
| x = 514 | 481 | 482 | 483 |

In some implementations, multiple execution lanes in a group share a same local memory bank, meaning that only one execution lane per group can read from or write to the local memory bank at a time. Therefore, the compiler can generate code for traversing the local bounding box that serializes the traversals and writes to memory for execution lanes that share a local memory bank.

The system then generates program code that causes the image processor to compute the distortion function using the data stored in the local memory banks (140). In general, each execution lane can use the transfer function to compute a one-dimensional offset for each input support pixel in order to load the input support pixel stored in the local memory to compute the distortion function. To do so, each execution lane can execute program code that uses the transfer function to compute an offset that can be used to load each input pixel from memory into local register space. This process will be described in more detail below with reference to FIG. 3. For execution lanes that share a memory bank, the compiler can serialize the memory accesses so that each execution lane can access the data needed to compute the output pixel for the distortion function.

The execution lanes in the execution lane array can then compute a respective output pixel according to the distortion function using use the data loaded into the local register space of the execution lanes. For example, for the rescaling function, an execution lane can use a plurality of input pixels as samples and can compute a single output pixel that averages the input pixels, e.g., using bilinear sampling.

Figure 2:
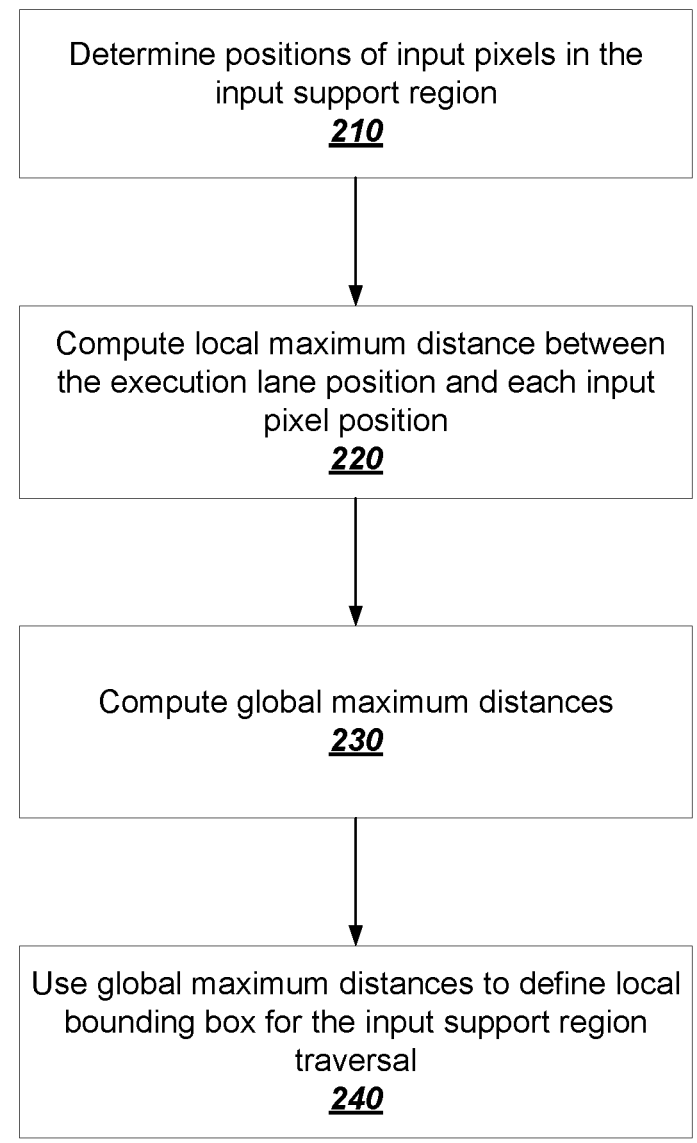
FIG. 2 is a flow chart of an example process for computing a local bounding box.

FIG. 2 is a flow chart of an example process for computing a local bounding box of an input support region for an output pixel. For clarity of presentation, the example process will be described as being performed by an image processor executing instructions generated by a compiler for a particular distortion function as described above with reference to FIG. 1.

Each execution lane determines a position of each input pixel in the input support region (210). In other words, each execution lane uses the coordinates of its output pixel as input to the transfer function in order to compute the positions of all input pixels in the support region.

Each execution lane computes a local maximum distance between its own position and the position of each input pixel determined the previous step (220). In other words, each execution lane determines which input pixel is furthest away from the output pixel location in both the x and y directions. The image processor can store the computed local maximum distances in shift-registers at the input pixel positions. In some implementations, each execution lane also computes a local minimum distance in x and y as well, which can reduce the size of the support region that needs to be traversed.

The image processor computes global maximum distances (230). To determine the global maximum distances from among the set of computed local maximum distances, the image processor can determine which execution lane has the highest local maximum and optionally the lowest local minimum in both the x and y directions. In some implementations, the image processor can determine these values by performing parallel reductions, e.g., find minimum and find maximum operations. Suitable techniques for performing parallel reductions using an image processor with an execution lane array and a shift-register array are described in commonly-owned U.S. patent application Ser. No. 15/201,269, which is herein incorporated by reference.

This process can involve some coordination between the scalar execution lane that directs control flow of the image processor and each of the execution lanes in the execution lane array. For example, after computing the global maximum distances in x and y, the scalar lane can distribute the global maximum distances to each execution lane in the execution lane array.

Each execution lane uses the global maximum distances to define a local bounding box for the input support region traversal (240). In addition, each execution lane can optionally use the global minimum distances to define the local bounding box for the input support region traversal.

FIG. 3 is a flow chart of an example process 300 for computing linear addresses that are used to load local bounding boxes from local memory banks into the shift-register array. The example process 300 can be performed by the shift-register array and the execution lane array.

The execution lane for an output pixel computes the distance between the base position of the global support region, i.e., the most distant corner of the global support region, and the position of the input pixel that the execution lane needs to access (310). The execution lane performs this computation in both the x dimension and the y dimension.

The execution lane subtracts its own position from the results of the previous step (320). The result is an x offset and a y offset, e.g., a shift distance in each dimension between the input pixel position and the output pixel position.

The execution lane is multiplies one offset by a width of the local bounding boxes and adds the result to the offset in the other dimension (330). If the process is configured to store the data in row-major layout, the execution lane can multiply the width of the local bounding box by the x-offset and add the y-offset. On the other hand, if column-major layout is used, the execution lane can multiply the width of the local bounding box by the y-offset and add the x-offset.

The result is the linear address of the desired input pixel in the local memory bank that is coupled to the execution lane. The execution lane can then load the data at the address into the execution lane, and the execution lane can use the data to compute the output pixel.

Figure 4:
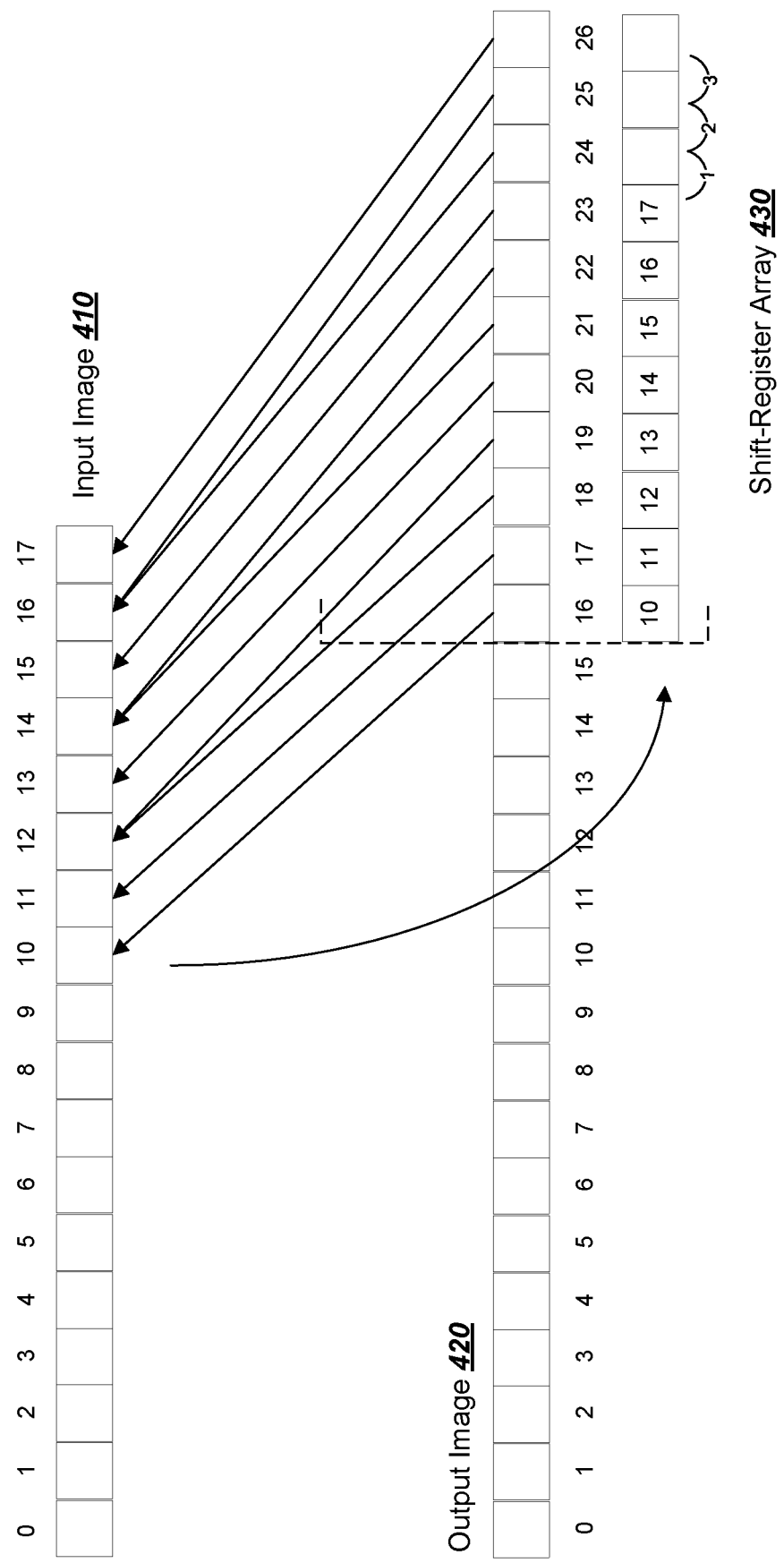
FIG. 4 illustrates an example distortion function performed on an input image.

FIG. 4 illustrates an example distortion function executed by the image processor on an input image 410. Specifically, the distortion function is a rescaling operation with a rescaling factor of 1.5. That is, when the image processor performs the distortion function on the input image 410, the resulting output image is 1.5 times larger than the input image 410. For simplicity, the input image 410 is a one-dimensional image with only a single row of pixels. In reality, the processor generally operates on two-dimensional images.

The input image 410 has 18 pixels that are labeled with ordered input coordinates ranging from 0 to 17. The output image 420 has 27 pixels that are labeled with ordered output coordinates ranging from 0 to 26. The output image 420 has 27 pixels because 27 is equal to 1.5 times 18. Each pixel in the output image 420 is based on a single pixel in the input image 410. Specifically, the output pixel at output coordinate N is the input pixel at input coordinate (N/1.5). For example, the output pixel at output coordinate 26 is the input pixel at input coordinate 17 because, ignoring any remainder, 26 divided by the scaling factor of 1.5 is equal to 17. Similarly, the output pixel at the output coordinate 25 is the input pixel at input coordinate 16 because, ignoring any remainder, 25 divided by 1.5 is equal to 16.

In some cases, adjacent output pixels are based on the same input pixel. For example, the output pixel at the output coordinate 24, like the output pixel at the output coordinate 25, is based on the input pixel at the input coordinate 16 because, ignoring any remainder, 24 divided by 1.5 is also equal to 16. In other words, the output pixels in the output image 420 are not a uniform distance away from the input pixels in the input image 410 on which they are based. The image processor described in this specification is not optimized to process image processing algorithms of this type.

Thus, to perform the rescaling operation, the compiler of the image processor can generate special program code. First, the compiler generates program code that determines a global support region of input pixels on which a block of output pixels are based. The output image 420 has two blocks: a first block has output pixels with output coordinates 0 to 15, and a second block has output pixels with output coordinates 16 to 26. In this example, assume that the image processor has 16 execution lanes, and that consequently, it can compute one output block at a time. Also assume that the image processor has already computed the output pixels in the first block, i.e., the output pixels with output coordinates 0 to 15. To compute the output pixels with output coordinates 16 to 26, the compiler must generate program code that determines the input pixels, i.e., the global support region, on which those output pixels are based, and that loads the global support region into the shift-register array. As mentioned above, the output pixel at output coordinate 26 is based on the input pixel at input coordinate 17. Meanwhile, the first output pixel in the second output block, i.e., the output pixel at the output coordinate 16, is based on the input pixel at the input coordinate 10 because, ignoring any remainder, 16 divided by the scaling factor of 1.5 is equal to 10. Thus, the output pixels at output coordinates 16 to 26 depend on the input pixels at input coordinates 10 to 17. The arrows in FIG. 4 depict the particular input pixel on which each output pixel in the second output block is based.

The image processor loads the input pixels from input coordinates 10 to 17 into the shift-register array 430 of the image processor. Importantly, the input pixel from input coordinate 10 is loaded into the shift-register dedicated to the execution lane position at which the initial output pixel (16) in the second block will be computed. This position serves as a reference coordinate when shift distances are calculated. Thereafter, the input pixels are loaded into the shift-register array in order. Because there are eleven distinct output pixels but only eight distinct input pixels on which those output pixels are based, some shift-registers remain empty.

Normally, the compiler would next generate program code that causes the image processor to compute a local bounding box for each output pixel and that causes the image processor to store the data within the local bounding box in a local memory bank that is coupled to the execution lane array at which the output pixel will be computed. Then, the image processor can load the local bounding box data from the local memory bank into the execution lane as it is need to compute the output pixel.

Alternatively, the compiler can generate instructions that cause the shift-register to perform sequences of shifts and selects that immediately move the correct data into the execution lane, bypassing the local memory bank completely. This method is more efficient when the distortion function is simple, e.g., when the distortion function is a rescaling operation.

Shifting the correct data into the execution lane at which an output pixel will be calculated involves determining a shift distance between the output pixel and the input pixel on which it is based. That shift distance is defined by the equation:

Distance=(Input Pixel Coordinate−Input Reference Coordinate Lane Position)

For the output pixel at the output coordinate 26, this computation proceeds as follows:

(17−10−10)=−3

That is, the input pixel coordinate is 17, the input reference coordinate is 10, and the lane position at which the output pixel is computed is 10 (26−16). The result is −3, which means that the input pixel must be shifted 3 positions to the right. This corresponds to the pictorial result illustrated in FIG. 4. The computation described above is the same as the computation that was described in reference to steps 310 and 320 of FIG. 3, except that the above computation was performed in only one dimension. The compiler can generate instructions that calculate shift amounts for each of the output pixels in the same way.

Figure 5:
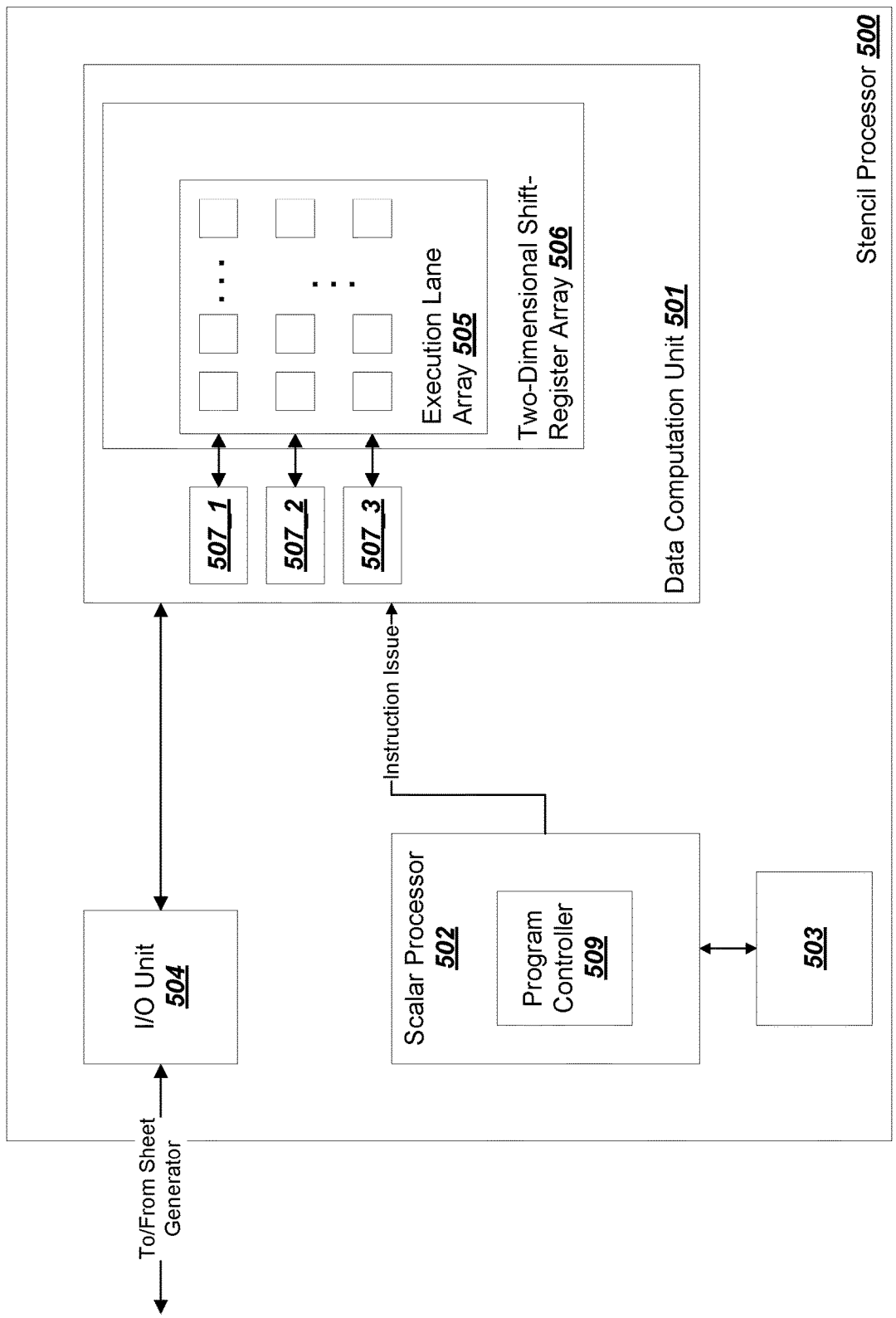
FIG. 5 is a diagram of an example stencil processor.

FIG. 5 illustrates the components of an example stencil processor. A stencil processor is an example of a processing component that can be used by an image processor to carry out the techniques described above. An image processor can have one or more stencil processors, which can be programmed to coordinate in order to accomplish different stages of a processing task. Other suitable architectures, which may make use of stencil processors, are described in more detail in commonly owned U.S. patent application Ser. Nos. 14/694,828; 14/694,815; 14/694,806; 14/960,334; 15/352,260; which are herein incorporated by reference.

As shown in FIG. 5, a stencil processor 500 includes a data computation unit 501, a scalar processor 502, an associated scalar memory bank 503, and an I/O unit 504. The data computation unit 501 includes an execution lane array 505, a two-dimensional shift-register array 506 and separate random access memory banks 507_1 through 507_R that are each associated with respective rows or columns of the two-dimensional execution lane array 506.

The I/O unit 504 is responsible for loading input sheets of data received from a sheet generator of the image processor into the data computation unit 501 and storing output sheets of data from the image processor into the sheet generator. Loading sheets of input data into the data computation unit 501 can include parsing a received sheet into rows or columns of image data and loading the rows or columns of image data into the two-dimensional shift-register array 506 or into respective memory banks 507 of the rows/columns of the execution lane array. If the input sheet is initially loaded into memory banks 507, the individual execution lanes within the execution lane array 505 can then load sheet data into respective portions of the two-dimensional shift register array 506 from the random access memory banks 507 when appropriate, e.g., as a load instruction just prior to operation on the sheet's data. Upon completion of the loading of a sheet of data into the shift-register array 506 whether directly from a sheet generator or from memories 507, the execution lanes of the execution lane array 505 can operate on the data and eventually write the finished data as a sheet directly back to the sheet generator, or, into the random access memory banks 507. If the latter, the I/O unit 504 can fetch the data from the random access memory banks 507 to form an output sheet, which can then be forwarded to the sheet generator.

The scalar processor 502 includes a program controller 509 that can read the instructions of the stencil processor's program code from scalar memory 503 and issue the instructions to the execution lanes in the execution lane array 505. In some implementations, a single same instruction is broadcast to all execution lanes within the execution lane array 505 to effect a single instruction, multiple data-like behavior from the data computation unit 501. In some implementations, the instruction format of the instructions read from scalar memory 503 and issued to the execution lanes of the execution lane array 505 includes a very-long-instruction-word (VLIW) type format that includes more than one opcode per instruction. In a further embodiment, the VLIW format includes both an ALU opcode that directs a mathematical function to be performed by each execution lane's ALU and a memory opcode that directs a memory operation for a specific execution lane or set of execution lanes.

Each execution lane is a component having one or more execution units capable of executing an instruction, e.g., logic circuitry that can execute an instruction. An execution lane can include additional processor-like functionality beyond just execution units. For example, besides one or more execution units, an execution lane can also include logic circuitry that decodes a received instruction, or, in the case of more MIMD-like designs, logic circuitry that fetches and decodes an instruction. With respect to MIMD-like approaches, a distributed approach can be implemented in various alternative embodiments, e.g., with a program controller within each execution lane of the execution lane array 505.

The combination of an execution lane array 505, a program controller 509 and a two dimensional shift-register array 506 provides a widely adaptable and configurable hardware platform for a broad range of programmable functions. For example, application software developers can generate kernel programs having a wide range of different functional capability as well as dimension, e.g., stencil size, because the individual execution lanes are able to perform a wide variety of functions and are able to readily access input image data proximate to any output location in the two-dimensional shift-register array 506.

Apart from acting as a data store for image data being operated on by the execution lane array 505, the random access memory banks 507 can also keep one or more look-up tables. In various embodiments one or more scalar look-up tables may also be instantiated within the scalar memory 503. A scalar look-up involves passing the same data value from the same look-up table from the same index to each of the execution lanes within the execution lane array 505. The VLIW instruction format can include a scalar opcode that directs a look-up operation performed by the scalar processor into a scalar look-up table. The index that is specified for use with the opcode may be an immediate operand or fetched from some other data storage location. A look-up from a scalar look-up table within scalar memory 503 can involve broadcasting the same data value to all execution lanes within the execution lane array 505 during the same clock cycle.

Figure 6:
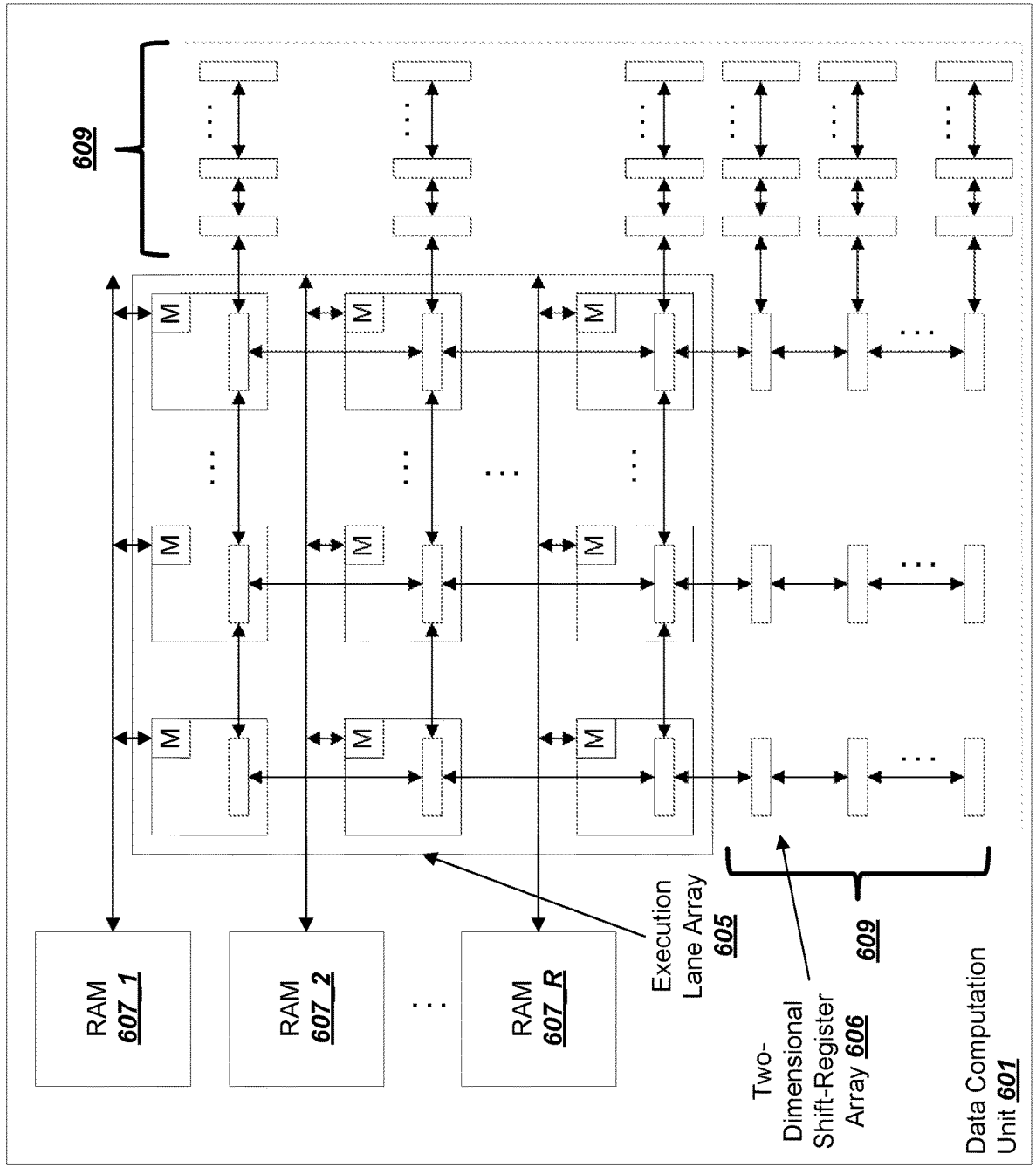
FIG. 6 is a diagram of an example data computation component.

FIG. 6 illustrates an example data computation component 601. As shown FIG. 6, the data computation component 601 includes an array of execution lanes 605 that are logically positioned "above" a two-dimensional shift-register array 606. As discussed above, in various embodiments, a sheet of image data provided by a sheet generator is loaded into the two-dimensional shift-register array 606. The execution lanes can then operate on the sheet data from the two-dimensional shift-register array 606.

The execution lane array 605 and shift-register array 606 are fixed in position relative to one another. However, the execution lanes can shift data within the shift-register array 606 in a strategic and coordinated fashion to cause each execution lane in the execution lane array 605 to have direct access to different input data. As such, each execution lane determines the output value for a different location in the output sheet being generated. From the architecture of FIG. 6, it should be clear that overlapping stencil regions can not only be arranged vertically but also horizontally because the execution lane array 605 includes vertically adjacent execution lanes as well as horizontally adjacent execution lanes.

Some notable architectural features of the data computation unit 601 include the shift-register array 406 having wider dimensions than the execution lane array 605. That is, there is a "halo" of registers 609 outside the execution lane array 605. Although the halo 609 is shown to exist on two sides of the execution lane array 605, depending on the implementation, the halo may exist on less (one) or more (three or four) sides of the execution lane array 605. The halo 609 serves to provide "spill-over" space for data that spills outside the bounds of the execution lane array 605 as the data is shifting "beneath" the execution lanes 605. As a simple case, a 5×5 stencil centered on the right edge of the execution lane array 605 may need four halo register locations further to the right when the stencil's leftmost pixels are processed. For ease of drawing, FIG. 6 illustrates the registers of the right side of the halo as only having horizontal shift connections and registers of the bottom side of the halo as only having vertical shift connections when, in a some implementations, registers on either side (right, bottom) would have both horizontal and vertical connections.

Additional spill-over room is provided by random access memory banks 607 that are coupled to each row and/or each column in the array, or portions thereof, e.g., a random access memory bank can be assigned to a "region" of the execution lane array 605 that spans 4 execution lanes row wise and 2 execution lanes column wise. For simplicity, some parts of this specification referred mainly to row and/or column based allocation schemes. Here, if an execution lane's kernel program operations require it to process pixel values outside of the two-dimensional shift-register array 606, which some image processing routines may require, the plane of image data is able to further spill-over, e.g., from the halo region 609 into a random access memory bank 607. For example, consider a 6×6 stencil in which the hardware includes a halo region of only four storage elements to the right of an execution lane on the right edge of the execution lane array. In this case, the data would need to be shifted further to the right off the right edge of the halo 609 to fully process the stencil. Data that is shifted outside the halo region 609 would then spill-over to random access memory 607.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Particular embodiments of the subject matter described in this specification can be employed in compact or battery powered devices, such as smartphones, tablets, or portable computers, so as to realize one or more of the following respective advantages. Because distortion functions can be executed in software on the image processor itself, the image processor need not have a separate hardware component dedicated to executing distortion functions. This reduces both the size of the image processor and the cost to manufacture the image processor. Additionally, using the methods described in this specification, the image processor can execute complex transfer functions more efficiently than a CPU by using the shift-register array and the execution lane array to perform the computations. The use of local memory to temporarily store input support regions also reduces off-chip memory accesses that would generally have to be performed in a CPU. This further improves the speed and energy efficiency of executing complex transfer functions in the image processor relative to a CPU.

In addition to the embodiments described above, the following embodiments are also innovative:

Embodiment 1 is a method comprising:
receiving a kernel program that defines how to compute an output image region from an input image region, wherein the kernel program defines a complex transfer function that specifies how to compute locations of one or more input pixels needed to compute each output pixel in the output image region; and
generating, from the kernel program, output code that when executed by an image processor having an execution lane array and a two-dimensional shift-register array, causes the image processor to perform operations comprising:
loading data within the input image region into the two-dimensional shift-register array;
computing a local support region size needed to obtain input pixels required to compute each respective output pixel;
traversing, by each execution lane using the two-dimensional shift-register array, a respective local support region having the computed local support region size and storing input pixels encountered during the traversal into local memory of the image processor;

obtaining, by each execution lane from the local memory of the image processor, one or more input pixels according to the complex transfer function; and computing, by each execution lane, a respective output pixel for the kernel program using one or more input pixels obtained from the local memory according to the complex transfer function.

Embodiment 2 is the method of embodiment 1, further comprising:

computing, by each execution lane according to the transfer function, an offset of data needed to obtain the one or more input pixels from the local memory to compute a respective output pixel for the execution lane; and loading, by each execution lane, the one or more input pixels from the local memory using the computed offset.

Embodiment 3 is the method of any one of embodiments 1-2, wherein loading data within the input image region into the two-dimensional shift-register array comprises:

computing a global support region needed to compute the output image region from the input image region; and loading data within the global support region into the two-dimensional shift-register array.

Embodiment 4 is the method of any one of embodiments 1-3, wherein the local memory has one-dimensional direct addressing.

Embodiment 5 is the method of any one of embodiments 1-4, wherein traversing, by each execution lane using the two-dimensional shift-register array, a respective local support region comprises:

computing, by each execution lane, a respective size of a local bounding box based on a maximum distance between the output pixel and each input pixel needed to compute the output pixel; and traversing the local bounding box.

Embodiment 6 is the method of embodiment 5, further comprising computing the maximum distance including using the two-dimensional shift-register array to perform a parallel reduction over respective local maximums computed by each execution lane.

Embodiment 7 is the method of any one of embodiments 1-6, further comprising:

determining that the kernel program has a buffer index that includes a function call; and in response, generating the output code using a procedure that is specific to kernel programs having complex transfer functions.

Embodiment 8 is the method of any one of embodiments 1-7, further comprising computing a global support region needed to compute the output region for the kernel program including computing one or more corners of the global support region by executing the complex transfer function and providing, to the complex transfer function, one or more pairs of coordinates of one or more corners of the output region.

Embodiment 9 is system comprising: one or more computers and one or more storage devices storing instructions that are operable, when executed by the one or more computers, to cause the one or more computers to perform the method of any one of embodiments 1 to 8.

Embodiment 10 is a computer storage medium encoded with a computer program, the program comprising instructions that are operable, when executed by data processing apparatus, to cause the data processing apparatus to perform the method of any one of embodiments 1 to 8.

Embodiment 11 is a method performed by a computing device having an image processor comprising an execution lane array and a two-dimensional shift-register array, wherein the image processor is configured to execute instructions to perform operations defined by a kernel program to generate an output image region from an input image region, the kernel program having a complex transfer function, wherein the method comprises:

loading data within the input image region into the two-dimensional shift-register array;

computing a local support region size needed to obtain input pixels required to compute each respective output pixel;

traversing, by each execution lane using the two-dimensional shift-register array, a respective local support region having the computed local support region size and storing input pixels encountered during the traversal into local memory of the image processor;

obtaining, by each execution lane from the local memory of the image processor, one or more input pixels according to the complex transfer function; and computing, by each execution lane, a respective output pixel for the kernel program using one or more input pixels obtained from the local memory according to the complex transfer function.

Embodiment 12 is the method of claim 11, further comprising:

computing, by each execution lane according to the transfer function, an offset of data needed to obtain the one or more input pixels from the local memory to compute a respective output pixel for the execution lane; and loading, by each execution lane, the one or more input pixels from the local memory using the computed offset.

Embodiment 13 is the method of any one of embodiments 11-12, wherein loading data within the input image region into the two-dimensional shift-register array comprises:

computing a global support region needed to compute the output image region from the input image region; and loading data within the global support region into the two-dimensional shift-register array.

Embodiment 14 is the method of any one of embodiments 11-13, wherein the local memory has one-dimensional direct addressing.

Embodiment 15 is the method of any one of embodiments 11-14, wherein traversing, by each execution lane using the two-dimensional shift-register array, a respective local support region comprises:

computing, by each execution lane, a respective size of a local bounding box based on a maximum distance between the output pixel and each input pixel needed to compute the output pixel; and traversing the local bounding box.

Embodiment 16 is the method of embodiment 13, further comprising computing the maximum distance including using the two-dimensional shift-register array to perform a parallel reduction over respective local maximums computed by each execution lane.

Embodiment 17 is the method of any one of embodiments 11-16, wherein the instructions were generated from an input program that includes a buffer index that includes a function call, and wherein the instructions were generated using a procedure that is specific to kernel programs having complex transfer functions.

Embodiment 18 is the method of any one of embodiments 11-17, further comprising computing a global support region needed to compute the output region for the kernel program including computing one or more corners of the global support region by executing the complex transfer function and providing, to the complex transfer function, one or more pairs of coordinates of one or more corners of the output region.

Embodiment 19 is a computing device employing an image processor, the image processor comprising an execution lane array and a two-dimensional shift-register array, wherein the image process is configured to perform the method of any one of embodiments 11-18.

Embodiment 20 is a computer storage medium encoded with a computer program, the program comprising instructions that are operable, when executed by an image processor comprising an execution lane array and a two-dimensional shift-register array cause the image processor to perform the method of any one of embodiments 11-18.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A computer-implemented method comprising:
   loading data within an input image region into a two-dimensional shift-register array of an image processor;
   computing a local support region size needed to obtain input pixels required to compute each respective output pixel in an output image region;
   traversing, by each of a plurality of execution lanes using the two-dimensional shift-register array, a respective local support region having the computed local support region size and storing input pixels encountered during the traversal into local memory of the image processor;
   obtaining, by each execution lane from the local memory of the image processor, one or more respective input pixels required to compute a respective output pixel by the execution lane; and
   computing, by each execution lane, a respective output pixel using one or more respective input pixels obtained from the local memory.

2. The method of claim 1, wherein the method comprises executing instructions that define how to compute an output image region from an input image region.

3. The method of claim 1, wherein the method comprises executing instructions that define a complex transfer function that specifies how to compute locations of the one or more input pixels required to compute the respective output pixel in an output image region.

4. The method of claim 1, wherein traversing the respective local support region comprises shifting data in the two-dimensional shift-register array according to a pattern corresponding to a shape of the local support region.

5. The method of claim 4, wherein traversing the respective local support region comprises:
   computing, by each execution lane, a respective size of a local bounding box based on a maximum distance between the output pixel and each input pixel needed to compute the output pixel; and
   traversing the local bounding box.

6. The method of claim 1, wherein obtaining, by each execution lane from the local memory of the image processor, one or more respective input pixels required to compute a respective output pixel by the execution lane comprises:
   computing, by each execution lane according to a complex transfer function, an offset of data needed to obtain the one or more input pixels from the local memory to compute the respective output pixel for the execution lane; and
   loading, by each execution lane, the one or more input pixels from the local memory using the computed offset.

7. The method of claim 1, wherein loading data within the input image region into the two-dimensional shift-register array comprises:
   computing a global support region needed to compute the output image region from the input image region; and
   loading data within the global support region into the two-dimensional shift-register array.

8. The method of claim 1, wherein the local memory has one-dimensional direct addressing.

9. The method of claim 1, further comprising computing a global support region needed to compute the output region for a kernel program including computing one or more corners of the global support region by executing a complex transfer function and providing, to the complex transfer function, one or more pairs of coordinates of one or more corners of the output region.

10. A computing device employing an image processor, the image processor comprising an execution lane array and a two-dimensional shift-register array,
    wherein the image processor is configured to execute instructions to perform operations comprising:

loading data within an input image region into a two-dimensional shift-register array;

computing a local support region size needed to obtain input pixels required to compute each respective output pixel in an output image region;

traversing, by each of a plurality of execution lanes using the two-dimensional shift-register array, a respective local support region having the computed local support region size and storing input pixels encountered during the traversal into local memory of the image processor;

obtaining, by each execution lane from the local memory of the image processor, one or more respective input pixels required to compute a respective output pixel by the execution lane; and computing, by each execution lane, a respective output pixel using one or more respective input pixels obtained from the local memory.

11. The computing device of claim 10, wherein the instructions define how to compute an output image region from an input image region.

12. The computing device of claim 10, wherein the instructions define a complex transfer function that specifies how to compute locations of the one or more input pixels required to compute the respective output pixel in an output image region.

13. The computing device of claim 10, wherein traversing the respective local support region comprises shifting data in the two-dimensional shift-register array according to a pattern corresponding to a shape of the local support region.

14. The computing device of claim 13, wherein traversing the respective local support region comprises:

computing, by each execution lane, a respective size of a local bounding box based on a maximum distance between the output pixel and each input pixel needed to compute the output pixel; and traversing the local bounding box.

15. The computing device of claim 10, wherein obtaining, by each execution lane from the local memory of the image processor, one or more respective input pixels required to compute a respective output pixel by the execution lane comprises:

computing, by each execution lane according to a complex transfer function, an offset of data needed to obtain the one or more input pixels from the local memory to compute the respective output pixel for the execution lane; and loading, by each execution lane, the one or more input pixels from the local memory using the computed offset.

16. The computing device of claim 10, wherein loading data within the input image region into the two-dimensional shift-register array comprises:

computing a global support region needed to compute the output image region from the input image region; and loading data within the global support region into the two-dimensional shift-register array.

17. The computing device of claim 10, wherein the local memory has one-dimensional direct addressing.

18. The computing device of claim 10, wherein the operations further comprise computing a global support region needed to compute the output region for a kernel program including computing one or more corners of the global support region by executing a complex transfer function and providing, to the complex transfer function, one or more pairs of coordinates of one or more corners of the output region.

19. One or more non-transitory computer storage media encoded with computer program instructions that when executed by an image processor comprising an execution lane array and a two-dimensional shift-register array, causes the image processor to perform operations comprising:

loading data within an input image region into a two-dimensional shift-register array;

computing a local support region size needed to obtain input pixels required to compute each respective output pixel in an output image region;

traversing, by each of a plurality of execution lanes using the two-dimensional shift-register array, a respective local support region having the computed local support region size and storing input pixels encountered during the traversal into local memory of the image processor;

obtaining, by each execution lane from the local memory of the image processor, one or more respective input pixels required to compute a respective output pixel by the execution lane; and computing, by each execution lane, a respective output pixel using one or more respective input pixels obtained from the local memory.

20. The one or more non-transitory computer storage media of claim 19, wherein the instructions define a complex transfer function that specifies how to compute locations of the one or more input pixels required to compute the respective output pixel in an output image region.

* * * * *